United States Patent
Sun et al.

(10) Patent No.: US 8,949,373 B2
(45) Date of Patent: Feb. 3, 2015

(54) METHOD AND SYSTEM FOR PLAYING MULTIMEDIA ON VIRTUAL DESKTOP, CLOUD-BASED SYSTEM FOR PROVIDING VIRTUAL DESKTOP AND COMPUTER READABLE STORAGE MEDIUM APPLYING THE METHOD

(75) Inventors: Jui-Hao Sun, Pingtung County (TW); Yu-Wei Chuang, Taichung (TW); Feng-Cheng Lin, Taipei (TW)

(73) Assignee: Institute for Information Industry, Taipei (TW)

( * ) Notice: Subject to any disclaimer, the term of this patent is extended or adjusted under 35 U.S.C. 154(b) by 161 days.

(21) Appl. No.: 13/323,836

(22) Filed: Dec. 13, 2011

(65) Prior Publication Data
US 2013/0117416 A1    May 9, 2013

(30) Foreign Application Priority Data

Nov. 8, 2011 (TW) ............... 100140761 A

(51) Int. Cl.
*G06F 15/16* (2006.01)
*G06F 3/00* (2006.01)
*G06F 9/44* (2006.01)
*H04L 29/08* (2006.01)

(52) U.S. Cl.
CPC .............. *G06F 9/4445* (2013.01); *H04L 67/26* (2013.01); *H04L 67/2823* (2013.01)
USPC ........... 709/217; 709/219; 709/204; 715/738; 375/240.25

(58) Field of Classification Search
USPC ......... 709/217–219, 228–232, 246, 203–204; 718/1; 726/8; 455/418; 715/738–740; 725/114
See application file for complete search history.

(56) References Cited

U.S. PATENT DOCUMENTS

| | | | | |
|---|---|---|---|---|
| 6,606,708 | B1* | 8/2003 | Devine et al. .................. 726/8 |
| 7,730,157 | B2* | 6/2010 | Baratto et al. ................ 709/217 |
| 8,224,308 | B1* | 7/2012 | Gavrylyako et al. .......... 455/418 |
| 2007/0260702 | A1* | 11/2007 | Richardson et al. .......... 709/217 |
| 2009/0248802 | A1 | 10/2009 | Mahajan et al. |
| 2010/0106798 | A1* | 4/2010 | Barreto et al. ................ 709/217 |
| 2010/0275200 | A1* | 10/2010 | Radhakrishnan et al. ........ 718/1 |
| 2011/0138069 | A1 | 6/2011 | Momchilov et al. |
| 2011/0138295 | A1* | 6/2011 | Momchilov et al. .......... 715/740 |
| 2011/0154214 | A1* | 6/2011 | Mahajan ....................... 715/738 |
| 2012/0011280 | A1* | 1/2012 | Gilboa .......................... 709/246 |

OTHER PUBLICATIONS

Ricardo A. Baratto, Shaya Potter, Gong Su, and Jason Nieh, "MobiDesk: Mobile Virtual Desktop Computing", by published in MobiCom '04, Sep. 26-Oct. 1, 2004, Philadelphia, Pennsylvania, USA.*

* cited by examiner

*Primary Examiner* — Wing F Chan
*Assistant Examiner* — Rajeshwari Krishnan
(74) *Attorney, Agent, or Firm* — CKC & Partners Co., Ltd.

(57) ABSTRACT

A method for playing multimedia on virtual desktop includes the following steps: a cloud-based system receives a virtual desktop request from a client. The cloud-based system provides a virtual desktop to the client through a virtual desktop connection for the client to display. The cloud-based system receives a request of multimedia streaming through the virtual desktop connection for obtaining a target multimedia file to display on the virtual desktop of the client. The cloud-based system obtains the target multimedia file. The cloud-based system builds a PUSH connection with the client and transmits the target multimedia file to the client through the PUSH connection for playing the target multimedia file on the virtual desktop of the client.

18 Claims, 2 Drawing Sheets

METHOD AND SYSTEM FOR PLAYING MULTIMEDIA ON VIRTUAL DESKTOP, CLOUD-BASED SYSTEM FOR PROVIDING VIRTUAL DESKTOP AND COMPUTER READABLE STORAGE MEDIUM APPLYING THE METHOD

RELATED APPLICATIONS

This application claims priority to Taiwan Application Serial Number 100140761, filed Nov. 8, 2011, which is herein incorporated by reference.

BACKGROUND

1. Technical Field

The present invention relates to a cloud-based system for providing a virtual desktop, a method related to a virtual desktop and a computer readable storage medium applying the method. More particularly, the present invention relates to a cloud-based system for playing multimedia on a virtual desktop, a method for playing multimedia on a virtual desktop and a computer readable storage medium applying the method.

2. Description of Related Art

The computer user interface has been through great change in the past few years. User interfaces provide a command line interface to executing application programs according to character commands input by users in the beginning. Graphical User Interface (GUI) is developed subsequently and provides a user-friendly interface through graphical icons.

Recently, virtual desktop computing is very popular. Users can store their data and application in remote computers, and with a virtual desktop, they can access the stored data and application by any computer. As a result, users may own virtual computers carried with them.

Since most virtual desktops are implemented by transmitting images of the same, it is important to have a broad bandwidth for transmitting the images of virtual desktops. A huge amount of bandwidth is needed especially for playing multimedia on a virtual desktop, but it may come to that requested multimedia can not be played smoothly. Furthermore, a specific virtual desktop interface has to be installed in both remote computers and computers for requesting virtual desktop from the remote computers, which is not convenient.

SUMMARY

According to one embodiment of this invention, a method for playing multimedia on virtual desktop is provided to receive a request for multimedia streaming from a client and to transmit the requested multimedia to the client for playing on the virtual desktop of the client through different connection. The method for playing multimedia on virtual desktop includes the following steps:

(a) a virtual desktop request is received from a client by a cloud-based system.

(b) a virtual desktop is provided to the client through a virtual desktop connection for the client to display by the cloud-based system.

(c) a request of multimedia streaming is received through the virtual desktop connection by the cloud-based system for obtaining a target multimedia file to display on the virtual desktop of the client.

(d) the target multimedia file is obtained by the cloud-based system.

(e) a PUSH connection with the client is built and the target multimedia file is transmitted to the client through the PUSH connection by the cloud-based system for playing the target multimedia file on the virtual desktop of the client.

According to another embodiment of this invention, a computer-readable storage medium storing a computer program for executing the steps of the aforementioned method for playing multimedia on virtual desktop is provided. Steps of the method are as disclosed above.

According to another embodiment of this invention, a cloud-based system for providing virtual desktop is provided to receive a request for multimedia streaming from a client and to transmit the requested multimedia to the client for playing on the virtual desktop of the client through different connections. The cloud-based system for providing virtual desktop includes a virtual desktop server and a PUSH server. After receiving a virtual desktop request through a network from a client, the virtual desktop server builds a virtual desktop connection to the client through the network. The virtual desktop server provides a virtual desktop to the client through the virtual desktop connection for the client to display. The PUSH server builds a PUSH connection with the client through the network. The virtual desktop server receives a request of multimedia streaming for obtaining a target multimedia file to display on the virtual desktop of the client through the virtual desktop connection. The cloud-based system obtains the target multimedia file and transmits the target multimedia file through the PUSH connection to the client for playing the target multimedia file on the virtual desktop of the client.

The present invention can achieve many advantages. Needed bandwidth for transmitting multimedia can be reduced and as a result requested multimedia files can be played smoothly without limited by the bandwidth. In addition, without converting requested multimedia into frames, computation resource of the cloud-based system can be saved. Moreover, if clients utilize different VDI to request a same cloud-based system for virtual desktops and multimedia files, the cloud-based system may convert the requested multimedia according to environment parameters of clients. In other words, one embodiment of this invention is compatible with clients with different environment parameters.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
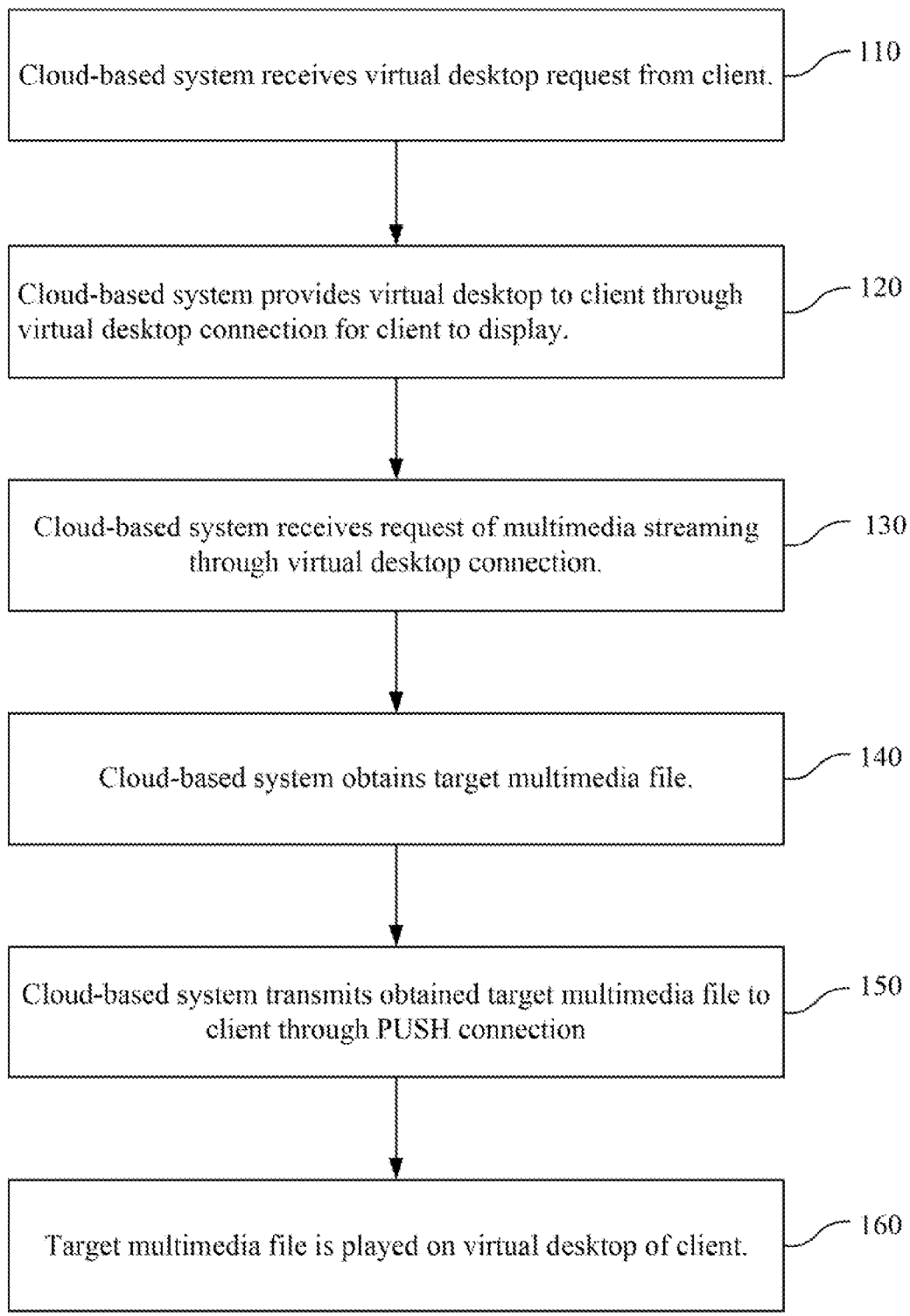
FIG. 1 is a flow diagram of a method for playing multimedia on virtual desktop according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, a flow diagram will be described that illustrates a method for playing multimedia on virtual desktop according to one embodiment of this invention. In the method for playing multimedia on virtual desktop, a request for multimedia streaming is received from a client and the requested multimedia is transmitted to the client for playing on the virtual desktop of the client through different connection. The method for playing multimedia on virtual desktop may take the form of a computer program stored on a computer-readable storage medium. Any suitable storage medium may be used. In some embodiments, such suitable storage medium may be a non-transitory computer readable storage medium including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives. In other embodiments, other suitable storage mediums may be used, which should not be limited in this disclosure.

The routine 100 for the method for playing multimedia on virtual desktop may starts at operation 110, where a cloud-based system receives a virtual desktop request from a client. In some embodiments, the cloud-based system may utilize a streaming technology to receive the virtual desktop request. The streaming technology may be implemented with providing the virtual desktop to the client by a virtual desktop interface (VDI). In addition, the cloud-based system may further receive an environment parameter of the client from the client. The environment parameter of the client may be a display size of a browser, a browser version of the browser, a resolution setting of the client, at least one supported multimedia format of the client, a present operating system (OS) of the client, any other environment parameter related to multimedia playing or combination thereof. Furthermore, after the virtual desktop request is received, the cloud-based system builds a PUSH connection with the client.

From operation 110, the routine 100 continues to operation 120, where the cloud-based system provides a virtual desktop to the client through a virtual desktop connection for the client to display. The virtual desktop connection is built following the VDI which the client utilizes to transmit the virtual desktop request. Subsequently, a user of the client can do some operations on the virtual desktop of the client. In some embodiments, the provided virtual desktop may follow a supported format of a browser, such that the virtual desktop of the client can be displayed by a browser. Therefore, the display of the virtual desktop may not be limited by OS installed on the client.

The routine 100 continues to operation 130, where the cloud-based system receives a request of multimedia streaming for obtaining a target multimedia file to display on the virtual desktop of the client through the virtual desktop connection. In practical, a user of the client may operate the virtual desktop of the client to request for playing the target multimedia file. In subsequence, the client may generate the corresponding request and transmits the same to the cloud-based system. The request of multimedia streaming may be generated following VDI.

The routine 100 continues to operation 140, where the cloud-based system obtains the target multimedia file. In some embodiments, Multipurpose Internet Mail Extensions (MIME) and Multi-media On Demand (MOD) service can be installed on the cloud-based system. Hence, if the cloud-based system receives a request of multimedia streaming (operation 130), MIME-MOD service may trigger operation 140. In some embodiments, the cloud-based system may convert the target multimedia file according to the environment parameter of the client (for example, a display size of a browser of the client, a browser version of the browser of the client, a resolution setting of the client, at least one supported multimedia format of the client, a present OS of the client, any other environment parameter related to multimedia playing or combination thereof), such that the converted target multimedia file may be supported by the client.

The routine 100 continues to operation 150, where the cloud-based system transmits the target multimedia file to the client through the PUSH connection. In other words, the receiving of the request of multimedia streaming at operation 130 and the transmitting of the target multimedia file at operation 150 may be done through different connections.

In subsequence, the routine 100 continues to operation 160, where the target multimedia file is played on the virtual desktop of the client. In one embodiment of this invention, the client may decode the target multimedia file to obtain frames of the same, and the decoded frames may be overlapped on the virtual desktop of the client for playing on the virtual desktop of the client. Therefore, even if clients utilize different VDI to request the same cloud-based system for virtual desktops and multimedia files, the cloud-based system can provide multimedia files through the connection other than VDI (for example, PUSH connection) for playing on the virtual desktops of the clients. As a result, the cloud-based system does not have to convert multimedia files for different VDIs. In addition, since the cloud-based system transmits requested multimedia files other than frames of the same, needed bandwidth can be reduced and as a result requested multimedia files can be played smoothly without limited by the bandwidth. In addition, computation resource of the cloud-based system can be saved without converting requested multimedia into frames. In one embodiment of this invention, if clients utilize different VDI to request the same cloud-based system for virtual desktops and multimedia files, the cloud-based system may convert the requested multimedia according to environment parameters of clients. In other words, one embodiment of this invention is compatible with clients with different environment parameters.

Figure 2:
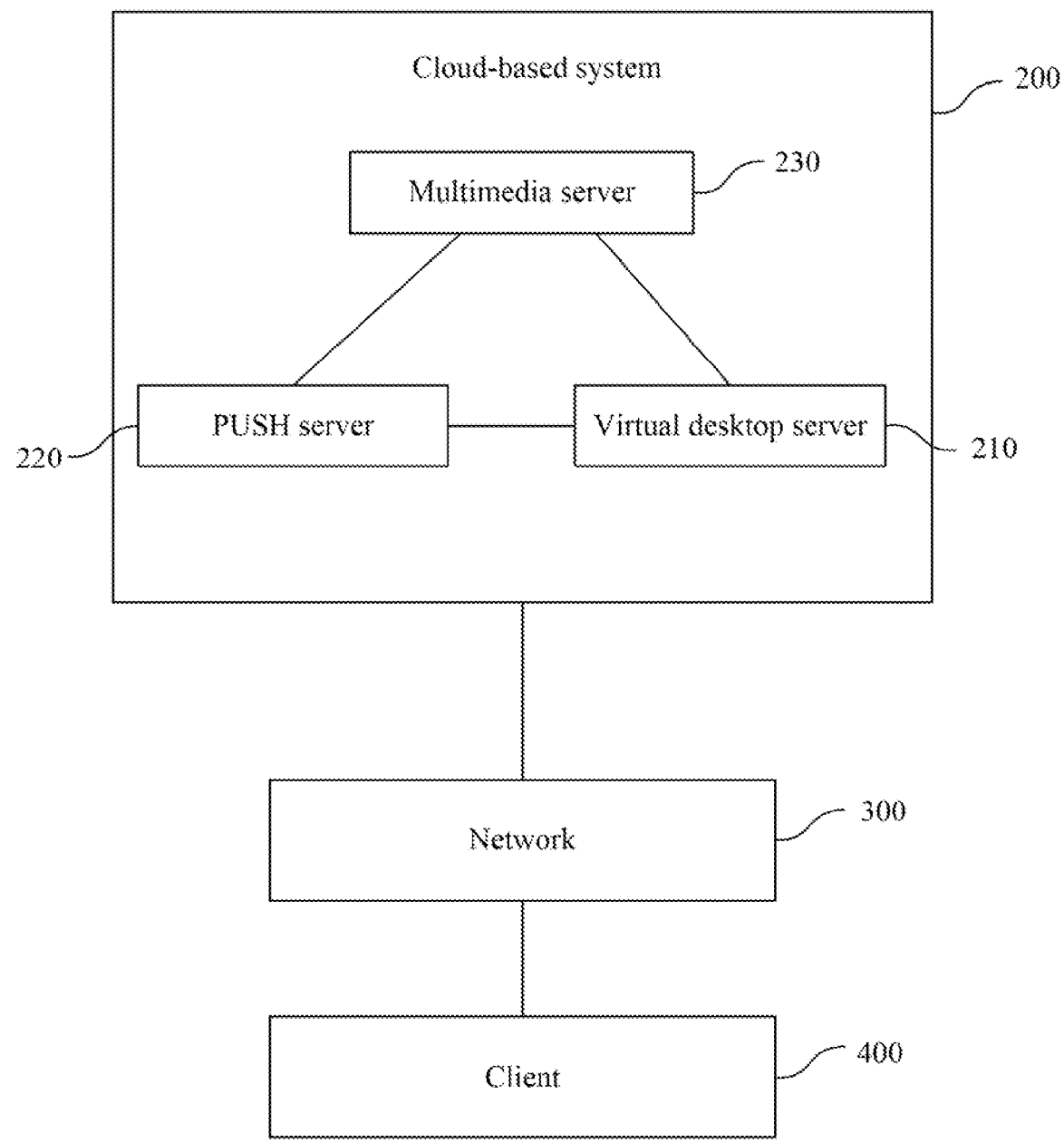
FIG. 2 illustrates a block diagram of a cloud-based system for providing virtual desktop system according to an embodiment of this invention.

Referring to FIG. 2, a block diagram will be described that illustrates a cloud-based system for providing virtual desktop system according to an embodiment of this invention. The cloud-based system for providing virtual desktop receives a request for multimedia streaming from a client and transmits the requested multimedia to the client for playing on the virtual desktop of the client through different connections.

The cloud-based system 200 includes a virtual desktop server 210 and a PUSH server 220. In some embodiments, the cloud-based system 200 may further include a multimedia server 230 for storing several pre-stored multimedia files. The multimedia server 230 may be mounted to the virtual desktop server 210. In one embodiment of this invention, the virtual desktop server 210, the PUSH server 220 and the multimedia server 230 can be respectively implemented by at least one cloud server. In another embodiment of this invention, the virtual desktop server 210, the PUSH server 220 and the multimedia server 230 can be implemented by one same server. In still another embodiment of this invention, the virtual desktop server 210, the PUSH server 220 and the multimedia server 230 can be distributed in several cloud servers.

After receiving a virtual desktop request through a network 300 from a client 400, the virtual desktop server 210 builds a virtual desktop connection to the client 400 through the network 300. In subsequence, the virtual desktop server 210 provides a virtual desktop to the client 400 through the virtual desktop connection for the client 400 to display. Subsequently, a user of the client 400 can do some operations on the virtual desktop of the client 400. In some embodiments, the provided virtual desktop may follow a supported format of a browser, such that the virtual desktop of the client 400 can be displayed by a browser. Therefore, the display of the virtual desktop may not be limited by OS installed on the client 400.

The PUSH server 220 builds a PUSH connection with the client 400 through the network 300. In some embodiments, after the virtual desktop server 210 receives the virtual desktop request, the PUSH server 220 may be driven to builds a PUSH connection with the client 400. In addition, the PUSH server 220 may further receive an environment parameter of the client 400 from the client 400. The environment parameter of the client may include a display size of a browser, a browser version of the browser, a resolution setting of the client, at least one supported multimedia format of the client, a present OS of the client, any other environment parameter related to multimedia playing or combination thereof.

If a user of the client 400 needs to play multimedia on the virtual desktop of the client 400 and do a corresponding operation to the virtual desktop, the client 400 may generate a request of multimedia streaming for obtaining a target multimedia file to display on the virtual desktop of the client 400. In some embodiments, the target multimedia file may be selected from the pre-stored multimedia files stored in the mounted multimedia server 230. In subsequence, the client 400 may transmit the request of multimedia streaming to the virtual server 210 through the virtual desktop connection. Hence, when the virtual desktop server 210 receives the request of multimedia streaming through the virtual desktop connection, the cloud-based system 200 obtains the target multimedia file from the multimedia server 230. In some embodiments, MIME-MOD service may be installed in the virtual desktop server 210. Hence, when the virtual desktop server 210 receives the request of multimedia streaming, MIME-MOD service may trigger to obtain the target multimedia file from the multimedia server 230. Furthermore, the virtual desktop server 210 may further drive the multimedia server 230 to convert the target multimedia file according to the environment parameter of the client 400 (for example, a display size of a browser of the client 400, a browser version of the browser of the client 400, a resolution setting of the client 400, at least one supported multimedia format of the client 400, a present OS of the client 400, any other environment parameter related to multimedia playing or combination thereof), such that the converted target multimedia file may be supported by the client.

The PUSH server 220 transmits the target multimedia file to the client 400 through the PUSH connection for playing the target multimedia file on the virtual desktop of the client 400. In one embodiment of this invention, the client 400 may decode the target multimedia file to obtain frames of the same, and the decoded frames may be overlapped on the virtual desktop of the client 400 for playing on the virtual desktop of the client 400. Therefore, even if clients utilize different VDI to request the same cloud-based system 200 for virtual desktops and multimedia files, the cloud-based system 200 can provide multimedia files through the connection other than VDI (for example, PUSH connection) for playing on the virtual desktops of the clients. As a result, the cloud-based system 200 does not have to convert multimedia files for different VDIs. In addition, since the cloud-based system 200 transmits requested multimedia files other than frames of the same to the client 400, needed bandwidth can be reduced and as a result requested multimedia files can be played smoothly without limited by the bandwidth. In addition, computation resource of the cloud-based system 200 can be saved without converting requested multimedia into frames. In one embodiment of this invention, if clients utilize different VDI to request the same cloud-based system 200 for virtual desktops and multimedia files, the cloud-based system 200 may convert the requested multimedia according to environment parameters of clients. In other words, the cloud-based system 200 is compatible with clients with different environment parameters.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for playing multimedia on virtual desktop comprising:
    (a) receiving a virtual desktop request from a client by a virtual desktop server;
    (b) building a virtual desktop connection by the virtual desktop server to provide a virtual desktop to the client through the virtual desktop connection for the client to display;
    (c) receiving a request of multimedia streaming through the virtual desktop connection by the virtual desktop server for obtaining a target multimedia file to display on the virtual desktop of the client;
    (d) obtaining the target multimedia file from a multimedia server by the virtual desktop server;
    (e) building an additional PUSH-mode connection with the client by a push server and transmitting the target multimedia file to the client through the PUSH-mode connection by the push server for playing the target multimedia file on the virtual desktop of the client, wherein the PUSH-mode connection different from the virtual desktop connection, wherein the virtual desktop server drives the push server to build the PUSH-mode connection with the client in response to the virtual desktop server receiving the virtual desktop request from the client; and
    decoding the target multimedia file by the client to obtain frames of the target multimedia file, and overlapping the decoded frames on the virtual desktop of the client, such that the virtual desktop after the overlapping is played by the client.

2. The method for playing multimedia on a virtual desktop of claim 1, wherein the virtual desktop of the client is displayed by a browser.

3. The method for playing multimedia on virtual desktop of claim 2, wherein the target multimedia file is played by the browser.

4. The method for playing multimedia on virtual desktop of claim 1, wherein the virtual desktop connection is implemented with providing the virtual desktop to the client by a streaming technology.

5. The method for playing multimedia on virtual desktop of claim 1 further comprising:
   receiving an environment parameter of the client from the client by the push server;
   converting the target multimedia file according to the environment parameter of the client; and
   transmitting the converted target multimedia file to the client by the push server.

6. The method for playing multimedia on virtual desktop of claim 5, wherein the environment parameter of the client comprises a display size of a browser, a browser version of the browser, a resolution setting of the client, at least one supported multimedia format of the client or a present operating system (OS) of the client.

7. A cloud-based system for providing virtual desktop comprising:
   a virtual desktop server for building a virtual desktop connection through a network after receiving a virtual desktop request through the network from a client, and for providing a virtual desktop to the client through the virtual desktop connection for the client to display; and
   a PUSH server for building a PUSH-mode connection different from the virtual desktop connection with the client through the network, wherein the virtual desktop server drives the push server to build the PUSH-mode connection with the client in response to the virtual desktop server receiving the virtual desktop request from the client; and
   wherein the virtual desktop server receives a request of multimedia streaming for obtaining a target multimedia file to display on the virtual desktop of the client through the virtual desktop connection,
   wherein the cloud-based system obtains the target multimedia file and transmits the target multimedia file through the PUSH-mode connection to the client for playing the target multimedia file on the virtual desktop of the client
   wherein the client decodes the target multimedia file to obtain frames of the target multimedia file, and overlaps the decoded frames on the virtual desktop of the client, such that the client plays the virtual desktop after the overlapping.

8. The cloud-based system for providing virtual desktop of claim 7, wherein the cloud-based system receives an environment parameter of the client from the client through the PUSH-mode connection,
   wherein the virtual desktop server converting the target multimedia file according to the environment parameter of the client,
   wherein the PUSH server transmits the converted target multimedia file to the client through the PUSH-mode connection, such that the client plays the converted target multimedia file on the virtual desktop of the client.

9. The cloud-based system for providing virtual desktop of claim 7, wherein the virtual desktop of the client is displayed by a browser, the PUSH server transmits the target multimedia file to the browser of the client, such that the client utilizes the browser to display the target multimedia file on the virtual desktop.

10. The cloud-based system for providing virtual desktop of claim 7, wherein the virtual desktop server builds the virtual desktop connection through a virtual desktop interface.

11. The cloud-based system for providing virtual desktop of claim 7 further comprising a multimedia server for storing a plurality of pre-stored multimedia files.

12. The cloud-based system for providing virtual desktop of claim 11, wherein the multimedia server is mounted to the virtual desktop server.

13. A non-transitory computer readable storage medium with a computer program to execute a method for playing multimedia on virtual desktop, wherein the method for playing multimedia on virtual desktop comprises:
   (a) receiving a virtual desktop request from a client by a virtual desktop server;
   (b) building a virtual desktop connection by the virtual desktop server to provide a virtual desktop to the client through the virtual desktop connection for the client to display;
   (c) receiving a request of multimedia streaming through the virtual desktop connection by the virtual desktop server for obtaining a target multimedia file to display on the virtual desktop of the client;
   (d) obtaining the target multimedia file from a multimedia server by the virtual desktop server;
   (e) building an additional PUSH-mode connection with the client by a push server and transmitting the target multimedia file to the client through the PUSH-mode connection by the push server for playing the target multimedia file on the virtual desktop of the client, wherein the PUSH-mode connection different from the virtual desktop connection, wherein the virtual desktop server drives the push server to build the PUSH-mode connection with the client in response to the virtual desktop server receiving the virtual desktop request from the client; and
   decoding the target multimedia file by the client to obtain frames of the target multimedia file, and overlapping the decoded frames on the virtual desktop of the client, such that the virtual desktop after the overlapping is played by the client.

14. The non-transitory computer readable storage medium of claim 13, wherein the virtual desktop of the client is displayed by a browser.

15. The non-transitory computer readable storage medium of claim 14, wherein the target multimedia file is played by the browser.

16. The non-transitory computer readable storage medium of claim 13, wherein the virtual desktop connection is implemented with providing the virtual desktop to the client by a streaming technology.

17. The non-transitory computer-readable storage medium of claim 13, wherein the method for playing multimedia on virtual desktop further comprising:
   receiving an environment parameter of the client from the client by the push server;
   converting the target multimedia file according to the environment parameter of the client; and
   transmitting the converted target multimedia file to the client by the push server.

18. The non-transitory computer readable storage medium of claim 17, wherein the environment parameter of the client comprises a display size of the browser, a browser version of the browser, a resolution setting of the client, at least one supported multimedia format of the client or a present OS of the client.

* * * * *